United States Patent Office 3,379,613
Patented Apr. 23, 1968

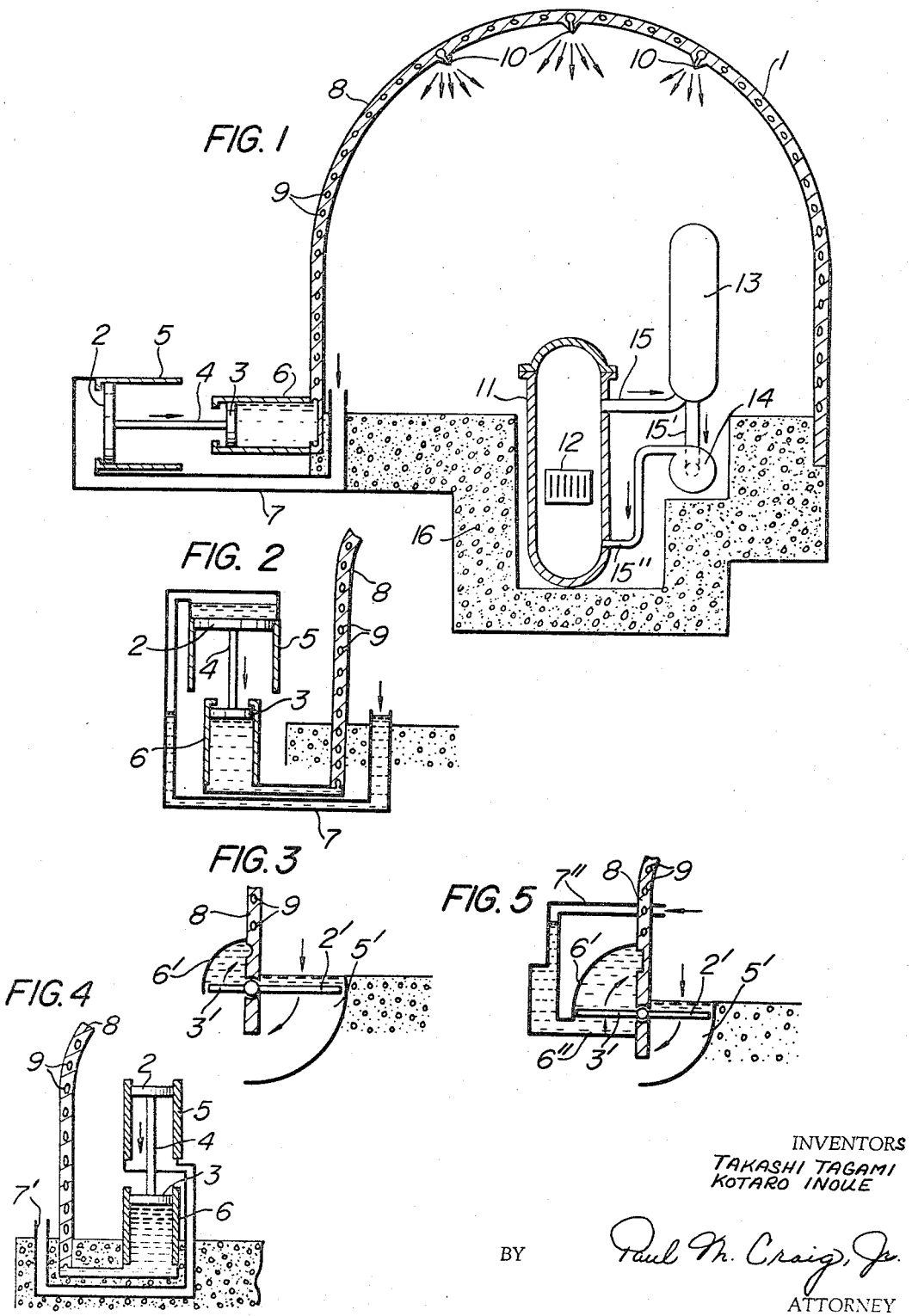

3,379,613
POST-INCIDENT DEVICE FOR NUCLEAR REACTORS
Takashi Tagami, Kokubunji-shi, and Kotaro Inoue, Tokyo, Japan, assignors to Hitachi, Ltd., Chiyoda-ku, Tokyo, Japan, a corporation of Japan
Filed Nov. 30, 1965, Ser. No. 510,539
Claims priority, application Japan, Dec. 15, 1964, 39/70,240
9 Claims. (Cl. 176—37)

ABSTRACT OF THE DISCLOSURE

The present disclosure relates to a nuclear reactor assembly comprising a nuclear reactor containing a primary coolant duct system disposed within a reactor container, said reactor container having associated therewith a pressure-safety device which is responsive to an increase in pressure on the inside of the reactor container. Thus, when an unusual pressure rise occurs within the container, this pressure rise is translated to the pressure-safety device which in turn triggers a cooling spray system within said container. The cooling spray reduces the pressure in the container and prevents leakage of the radioactive material, thus avoiding any possible disaster resulting therefrom.

---

This invention relates to post-incident devices for nuclear reactors and more particularly to those for water-moderated type nuclear reactors which are operable in an emergency, such as, failure of the primary coolant duct system of the reactor to form cooling sprays in the interior space of the reactor container, dry well, housing or other containment strucure accommodating the reactor and its primary coolant duct system. Cooling sprays reduce the pressure in the structure and prevent leakage of the radioactive material and any disaster resulting therefrom.

Water-modulated type nuclear reactors are conventionally equipped with a so-called container spraying device which serves the purpose of reducing the pressure in the reactor container and scrubbing off the radioactive material in failures of the main coolant duct of the reactor. With this conventional system, however, continuous observation and measurement of the pressure within the reactor container as well as of the leakage of radioactive material is required and, whenever the measured values exceed a definite level, a diesel engine or other power device separately provided is put into operation to form cooling sprays. Such system inherently involves the following serious drawbacks. Firstly, it necessitates a separate power source for the spraying means and a considerable delay in time is involved in starting the spraying operation. Secondly, it is very difficult to continuously observe the leakage of radioactive material through the walls of the reactor container. In addition, when the interior pressure of the container rises, a considerable leakage of radioactive material takes place as a result of unavoidable gaps or crevices, for example, in the welded container wall portions and at the pipe joints.

Accordingly, the present invention is intended to overcome the above deficiencies usually involved in conventional post-incident devices of the type described.

The present invention has for its object to provide a novel post-incident device of the type described which is automatically operable in emergencies, including failure of the primary coolant duct of the reactor to form cooling sprays, by utilization of the pressure rise in the inner space of the containment structure and without the use of any separate power source for the spraying purpose. The pressure in the structure can be reduced with no substantial delay in time and thus completely prevent any leakage of radioactive material.

To attain the above object, the present invention proposes to apply to the formation of emergency cooling sprays the principles of pressure leverage which utilizes the rise in pressure within the reactor containment structure.

The foregoing and other objects, features and advantages of the present invention will become apparent from the following description when taken in conjunction with the accompanying drawings, in which:

FIG. 1 is a schematic longitudinal cross section of a reactor containment with a post-incident device embodying the present invention; and FIGS. 2 to 5 schematically illustrate further embodiments of the invention.

Referring first to FIG. 1, reference numeral 1 indicates the reactor container which accommodates a nuclear reactor and its primary cooling system. In the drawing, reference numeral 11 indicates the pressure vessel of the reactor within which the reactor core is contained. Numeral 13 shows the heat-exchanger, 14 is the circulating pump for the primary coolant, 15, 15′ and 15″ are the ducts in the primary coolant circulating loop, and 16 is the concrete shielding wall. The primary coolant heated in the core 12 is fed through the duct 15 to the heat-exchanger 13, in which the heat is delivered to a secondary coolant. The cooled primary coolant is supplied through 15′ to the pump 14 which circulates the coolant back to the vessel 11 through the duct 15″. Since the primary coolant contains the fission products and is intensely radioactive, resulting from the direct contact with the nuclear fuel elements in the core 12 and the intense exposure to neutron rays, necessary measures must be taken to prevent the leakage of the primary coolant from the container 1, in the case of accidents, such as breakage of the ducts 15, 15′, or 15″ in the coolant loop. For this purpose, at least pressure vessel 11 containing the core 12 and the circulation loop of the primary coolant are confined to the container 1.

According to the present invention, in order to prevent the leakage of the pressurized primary coolant from the container when there is breakage in the coolant loop, a pressure lever or a pressure safety device is actuated by the increase in pressure inside the container to produce a higher back pressure than the inside pressure of the container 1, this back pressure causing the cooling media to be automatically sprayed within the container 1. The pressure lever herein referred to comprises a front pressure chamber (room) and a rear pressure chamber (room) which are separated from each other by a movable member such as a piston or rotary vane, the pressure-applying area of said first movable member, that is, the area facing to the front pressure chamber, being larger than the back pressure area, that is, the area facing to the rear pressure chamber, thus being adapted to cause a higher pressure to be produced in the rear pressure side than the pressure imposed on the pressure-applying area. Therefore, if the pressure within the container 1 is applied on the front pressure side of the pressure lever and a container of the cooling media for spray is connected to the rear pressure side, the back pressure which rapidly develops as a result of the rapid increase of the inside pressure of the container 1, causes the cooling media to be sprayed within the container 1. In the embodiment of FIGURE 1, pistons 2 and 3 interconnected by a rod 4 constitute a pressure lever and are received in respective cylinders 5 and 6, the latter 6 being filled with water. In this embodiment, the pistons 2 and 3 correspond to said movable member of the pressure lever, the chamber in the left side of the piston 2 being said front pressure chamber, and the chamber in the right side of the piston 3 being said rear pressure chamber. The diameter of the piston 2 is designed so as to be larger than the diameter of the piston 3, to make the pressure-applying area of the piston 2 larger than the back-pressure area of the piston 3. A conduit 7 is provided to transmit the pressure within the container 1 to the piston 2. In the wall 8 of the container is arranged an array of water passageways 9 through which water from the interior of the cylinder 6 is led to ejecting nozzles 10 and ejected therefrom into the reactor container 1.

With such arrangement, it is now assured that when the pressure within the container 1 is raised, for example, due to the failure of the primary cooling system in the container, the raised pressure is applied to the conduit 7 to the piston 2 so that piston 3, integrally connected with piston 2, is displaced and ejects the cooling water held in the cylinder 6 through nozzles 10 into the space in the reactor container 1. If it is assumed that P represents the pressure within the container, in atmospheres, $p$ represents the water head from piston 3 to nozzles 10, in atmospheres, and $S_1$ and $S_2$ represent the areas of the respective pistons 2 and 3, then the pressure force $T_1$ acting upon the piston 2 can be expressed by the formula $$T_1 = (P-1)S_1$$

and the pressure force $T_2$ acting upon the piston 3 can be expressed by the formula $$T_2 = (P+p-1)S_2$$

It is noted, therefore, that, in cases where $S_1$ is sufficiently large compared with $S_2$ (or $S_1/S_2 = a \gg 1$), the piston assembly 2-3 is at rest as long as the pressure P within the reactor container is held at atmospheric pressure, But, upon rapid rise of the pressure P within the container, the piston 3 acting upon the water in the cylinder immediately displaces the water so that it is ejected through the nozzles 10. In this manner, it will be recognized that the cooling purpose in emergencies is automatically served with the inventive device.

Though, in the above-described embodiment, the pressure lever is employed in a horizontal position, it is apparent that it can also be positioned vertically, for example, as shown in FIG. 2. Also, the pressure lever may take the form of a rotary blade type lever, as shown in FIG. 3, instead of the piston type used in FIGS. 1 and 2. In FIG. 3, rotor blades 2' and 3' are fixed to a common pivot to rotate through arcuate chambers 5' and 6', respectively. This blade type leverage operates in the same manner as the piston type shown in FIGS. 1 and 2, the blade 2' having an area $S_1$ sufficiently large compared with the area $S_2$ of the blade 3'. Thus, without a rise of the pressure within the container, the blades 3' force the water in the arcuate chamber 6' upwardly through the water passageways 9 to form sprays of water through the ejecting nozzles.

Though in the above embodiments the pistons 2 and 3 or blades 2' and 3' are designed to have different areas to enable utilization of the pressure rise in the container for automatic formation of emergency cooling sprays, the pistons or blades may have the same area if the pressure within the container is led also to act upon the back surface of the piston 3 (or blade 3') as in FIG. 4. In this figure, the pressure leverage is accommodated in a portion of the reactor container and is designed so that the pressure therein also acts upon the back side of the piston 3, the back side of the piston 2 being subjected to the atmospheric pressure through conduit 7'. The device of FIG. 4 functions in the same manner as one arranged as shown in FIG. 2 and having a piston area $S_1$ twice as large as the area $S_2$ of the piston 3. Another embodiment shown in FIG. 5 includes an arcuate chamber 6' through which the rotor blade 3' is operable, and a conduit 7'' for leading the pressure within the container to the back surface of the rotor blade 3'. It will readily be understood that this embodiment functions in quite the same manner as one arranged as shown in FIG. 3 and having an area ratio of 2 between the blades 2' and 3'.

To prevent leakage of gases out of the reactor container, it is preferable that water, oil or other highly viscous liquid is filled between the cylinder and the piston forming a part of the pressure lever, as shown in FIG. 2, or between the wall of the arcuate chamber and the blade operable therein, as shown in FIGS. 3 and 5.

A specific example according to the embodiment of FIG. 5 will next be described. In this example, three units of the device shown in FIG. 5 are arranged in the bottom portion of the reactor container with an array of ejecting nozzles formed for each of the three units. It is assumed that the height of the ejecting nozzles or their vertical distance from the rotor blade 3' is 10 meters, the total cross-sectional area of the orifices in each set of nozzles is 11.2 cm.$^2$ (the contraction coefficient of the jets being assumed to be 0.6), and the rotor blades 2' and 3' have respective areas of 3 m. x 4.97 m. and 3 m. x 3.55 m. Then, emergency cooling sprays are formed automatically when the pressure within the reactor container reaches the value of 1.5 kg./cm.$^2$ or over. Since such pressure rise takes place in an incident in approximately five seconds, it is understood that with this device the spraying will be automatically started only five seconds after the occurence of the incident to effectively reduce the pressure within the container while scrubbing the radioactive material therein.

To summarize the present invention, it directly utilizes the rise of pressure within the reactor container for spraying cooling water into its interior space by application of the principles of a pressure lever. The inventive post-incident device has various advantages over conventional devices. First of all, it is economical since it does not need any separate power source, which takes a considerable time to start working. Also the danger involving a delay in time of initiating an effective spraying operation or of misoperation due to trouble possibly occurring in the separate power system is completely avoided. It will be appreciated, therefore, that the inventive device can form in an emergency cooling sprays, without fail, immediately upon rise of the pressure within the reactor container. Further, the arrangement of the water passageways in the walls of the reactor container makes it possible to continuously observe the leakage of radioactive material out of the container by measuring the radioactivity of the cooling water. It will also be appreciated that in case of an incident, the cooling water serves to cool the container walls thereby aiding pressure reduction in the container. The cooling water also increases the wall effect of shielding the radiation of $\gamma$-rays emitted from the radioactive material dissipated into the space in the container as a result of an incident.

Though a few embodiments of the present invention have been described and shown herein, it will be apparent to those skilled in the art that various changes and modifications may be made without departing from the scope and spirit of the invention as defined in the appended claims.

What is claimed is:

1. A nuclear reactor assembly containing a pressure-safety device comprising, a nuclear reactor containing a primary coolant-duct system, said reactor-duct system disposed in a reactor container, means for introducing a cooling spray within said container, spray-forming means comprising a pressure safety device composed of first and second interconnected surface means capable of moving as a unit, said second surface means disposed in a fluid-containing chamber, said chamber communicating with said cooling spray introducing means, and means communicating with the interior of said reactor container for conveying the pressure within said container to said first surface means.

2. The nuclear reactor assembly of claim 1, wherein the means for introducing a cooling spray within said container comprises passageways disposed within the walls of the reactor container, said passageways communicating with the interior of said reactor container through nozzle means.

3. The nuclear reactor assembly of claim 1, wherein said first surface means is a first piston means slidably disposed in a first cylinder, and said second surface means is a second piston means connected to said first piston means and slidably disposed in a second cylinder, the pressure within the reactor container communicating with the pressure-applying face of said first piston means and the back pressure side of said second piston means communicating with the cooling spray introducing means.

4. The nuclear reactor assembly of claim 3, wherein said first piston means has a larger pressure-applying area than said second piston means.

5. The nuclear reactor assembly of claim 3, wherein the spray-forming means is disposed on the inside of the reactor container.

6. The nuclear reactor assembly of claim 5, wherein said first and second piston means have substantially the same surface area, the pressure-applying face of said second piston means communicating directly with the inside of the reactor container, and the back pressure side of said first piston means communicating with the atmosphere.

7. The nuclear reactor assembly of claim 1, wherein the first and second surface means are first and second rotor blade means connected to each other, and rotatably disposed, as a unit, in first and second chambers, the pressure within the reactor container communicating with the pressure-applying face of said first rotor blade means and the back pressure side of said second rotor blade means communicating with the cooling spray introducing means.

8. The nuclear reactor assembly of claim 7, wherein said first rotor blade means has a larger pressure-applying area than said second rotor blade means.

9. The nuclear reactor assembly of claim 7, wherein said first and second rotor blade means have substantially the same surface area, the pressure-applying face of said second rotor blade means communicating with the inside of the reactor container, and the back pressure side of said first rotor blade means communicating directly with the atmosphere.

References Cited
UNITED STATES PATENTS

| | | |
|---|---|---|
| 3,168,445 | 2/1965 | Ziegler et al. _____ 176—38 |
| 3,207,671 | 9/1965 | Kornbichler _____ 176—38 |
| 3,258,403 | 6/1966 | Malay. |

REUBEN EPSTEIN, *Primary Examiner.*

H. E. BEHREND, *Assistant Examiner.*